US012762012B2

(12) United States Patent
Kim

(10) Patent No.: US 12,762,012 B2
(45) Date of Patent: Oct. 13, 2026

(54) SEMICONDUCTOR MEMORY APPARATUS CONFIGURED TO PERFORM AN ERROR CHECK

(71) Applicant: SK hynix Inc., Icheon-si (KR)

(72) Inventor: Ji Soo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 78 days.

(21) Appl. No.: 18/733,308

(22) Filed: Jun. 4, 2024

(65) Prior Publication Data

US 2025/0238315 A1 Jul. 24, 2025

(30) Foreign Application Priority Data

Jan. 18, 2024 (KR) ........................ 10-2024-0008150

(51) Int. Cl.
*G06F 11/10* (2006.01)

(52) U.S. Cl.
CPC .................................. *G06F 11/102* (2013.01)

(58) Field of Classification Search
None
See application file for complete search history.

(56) References Cited

U.S. PATENT DOCUMENTS 6,973,613 B2 * 12/2005 Cypher .................. G11C 29/42 714/763
11,462,292 B1 * 10/2022 Kim ................... H03M 13/1168
2007/0226590 A1 * 9/2007 Nagai ................. G11C 11/4096 714/763
2015/0194984 A1 * 7/2015 Tsuboi .................. H03M 13/13 714/758
2017/0060680 A1 * 3/2017 Halbert ................... G06F 3/064
2018/0351574 A1 * 12/2018 Ware ..................... G06F 3/0653
2020/0394102 A1 * 12/2020 Cha ...................... G06F 11/1068
2021/0133028 A1 * 5/2021 Kim ..................... G06F 11/1004
2021/0191810 A1 * 6/2021 Cho ..................... G06F 11/1068
2021/0193245 A1 * 6/2021 Ryu ...................... G11C 7/1057
2022/0262447 A1 8/2022 Sudhakaran et al.
2025/0036520 A1 * 1/2025 Lim ..................... G06F 11/1004
2025/0181447 A1 * 6/2025 Kim ..................... G06F 11/1048

FOREIGN PATENT DOCUMENTS

KR 1020250090823 A 6/2025

* cited by examiner

*Primary Examiner* — Daniel F. McMahon
(74) *Attorney, Agent, or Firm* — WILLIAM PARK AND ASSOCIATES LTD.

(57) ABSTRACT

A semiconductor memory apparatus includes an encoding circuit, a read path circuit, a transmitter circuit, and a read error check circuit. The encoding circuit is configured to encode bank data to generate a read symbol. The read path circuit is configured to transmit the read symbol to the transmitter circuit. The transmitter circuit is configured to generate a multi-level signal based on the read symbol. The read error check circuit is configured to determine whether an error has occurred in the transmission of the read symbol from the encoding circuit to the transmitter circuit through the read path circuit.

17 Claims, 6 Drawing Sheets

SEMICONDUCTOR MEMORY APPARATUS CONFIGURED TO PERFORM AN ERROR CHECK

CROSS-REFERENCES TO RELATED APPLICATION

The present application claims priority under 35 U.S.C. § 119(a) to Korean patent application number 10-2024-0008150 filed on Jan. 18, 2024, in the Korean Intellectual Property Office, which application is incorporated herein by reference in its entirety.

BACKGROUND

1. Technical Field

Various embodiments generally relate to integrated circuit technology, and, more particularly, to a semiconductor memory apparatus configured to perform an error check.

2. Related Art

As the operation speed and data processing capacity of semiconductor memory apparatuses increase, the number of data signals to be processed during a single read and write operation increases as well. The semiconductor memory apparatus may receive serial data transmitted from an external device through a pad. The semiconductor memory apparatus can process multiple data signals at once by converting the serial data into parallel data. Accordingly, the semiconductor memory apparatus may be equipped with a complex signal transmission path in which the large number of data signals are transmitted. Because the signal transmission path includes a plurality of transmission lines and a plurality of drivers such as repeaters and latches, errors may occur during the data transmission process that cause a logic level of the data signals to change. The errors may directly affect the operational reliability of the semiconductor memory apparatus.

SUMMARY

In an embodiment, a semiconductor memory apparatus may include an encoding circuit, a read path circuit, a transmitter circuit, and a read error check circuit. The encoding circuit may be configured to encode bank data output from a memory cell array to generate a read symbol and may be configured to generate a first check bit from the read symbol. The read path circuit may be configured to transmit the read symbol. The transmitter circuit may be configured to generate a multi-level signal based on the read symbol received from the read path circuit, and may be configured to generate a second check bit from the read symbol. The read error check circuit may be configured to generate a read error signal based on the first check bit and the second check bit.

In an embodiment, a semiconductor memory apparatus may include a receiver circuit, a write path circuit, a decoding circuit, and a write error check circuit. The receiver circuit may be configured to receive a multi-level signal and generate a write symbol based on the multi-level signal, and may be configured to generate a first check bit from the write symbol. The write path circuit may be configured to transmit the write symbol. The decoding circuit may be configured to decode the write symbol received from the write path circuit to generate bank data and provide the bank data to a memory cell array, and may be configured to generate a second check bit from the write symbol. The write error check circuit may be configured to generate a write error signal based on the first check bit and the second check bit.

In an embodiment, a semiconductor memory apparatus may include a first memory bank, a second memory bank, a first encoding circuit, a second encoding circuit, a first read path circuit, a second read path circuit, a first transmitter circuit, a second transmitter circuit, a first read error check circuit, and a second read error check circuit. The first memory bank may output a first bank data. The second memory bank may output a second bank data. The first encoding circuit may be configured to encode the first bank data to generate a first read symbol, and may be configured to generate a first check bit from the first read symbol. The second encoding circuit may be configured to encode the second bank data to generate a second read symbol, and may be configured to generate a second check bit from the second read symbol. The first read path circuit may be configured to transmit the first read symbol, and may be configured to output one of the first read symbol and the second read symbol as a first selected read symbol based on a channel selection signal. The second read path circuit may be configured to transmit the second read symbol, and may be configured to provide the second read symbol to the first read path circuit or output the second read symbol as a second selected read symbol based on a channel mode signal. The first transmitter circuit may be configured to generate a first multi-level signal based on the first selected read symbol, and may be configured to generate a third check bit from the first selected read symbol. The second transmitter circuit may be configured to generate a second multi-level signal based on the second selected read symbol, and may be configured to generate a fourth check bit from the second selected read symbol. The first read error check circuit may be configured to generate a first read error signal based on one of the first and second check bits and the third check bit based on the channel selection signal. The second read error check circuit may be configured to generate a second read error signal based on the second and fourth check bits.

In an embodiment, a semiconductor memory apparatus may include a first receiver circuit, a second receiver circuit, a first write path circuit, a second write path circuit, a first decoding circuit, a second decoding circuit, a first memory bank, a second memory bank, a first write error check circuit, and a second write error check circuit. The first receiver circuit may be configured to generate a first write symbol based on a first multi-level signal, and may be configured to generate a first check bit from the first write symbol. The second receiver circuit may be configured to generate a second write symbol based on a second multi-level signal, and may be configured to generate a second check bit from the second write symbol. The first write path circuit may be configured to output the first write symbol as a first selected write symbol or provide the first write symbol to a second write path circuit based on a channel selection signal. The second write path circuit may be configured to output one of the first write symbol and the second write symbol as a second selected write symbol based on a channel mode signal. The first decoding circuit may be configured to decode the first selected write symbol to generate first bank data, and may be configured to generate a third check bit from the first selected write symbol. The second decoding circuit may be configured to decode the second selected write symbol to generate second bank data, and may be configured to generate a fourth check bit from the second selected write symbol. The first memory bank may store the first bank data. The second memory bank may store the second bank data. The first write error check circuit may be configured to generate a first write error signal based on one of the first and second check bits and the third check bit based on the channel selection signal. The second write error check circuit may be configured to generate a second write error signal based on the second and fourth check bits.

DETAILED DESCRIPTION

Figure 1:
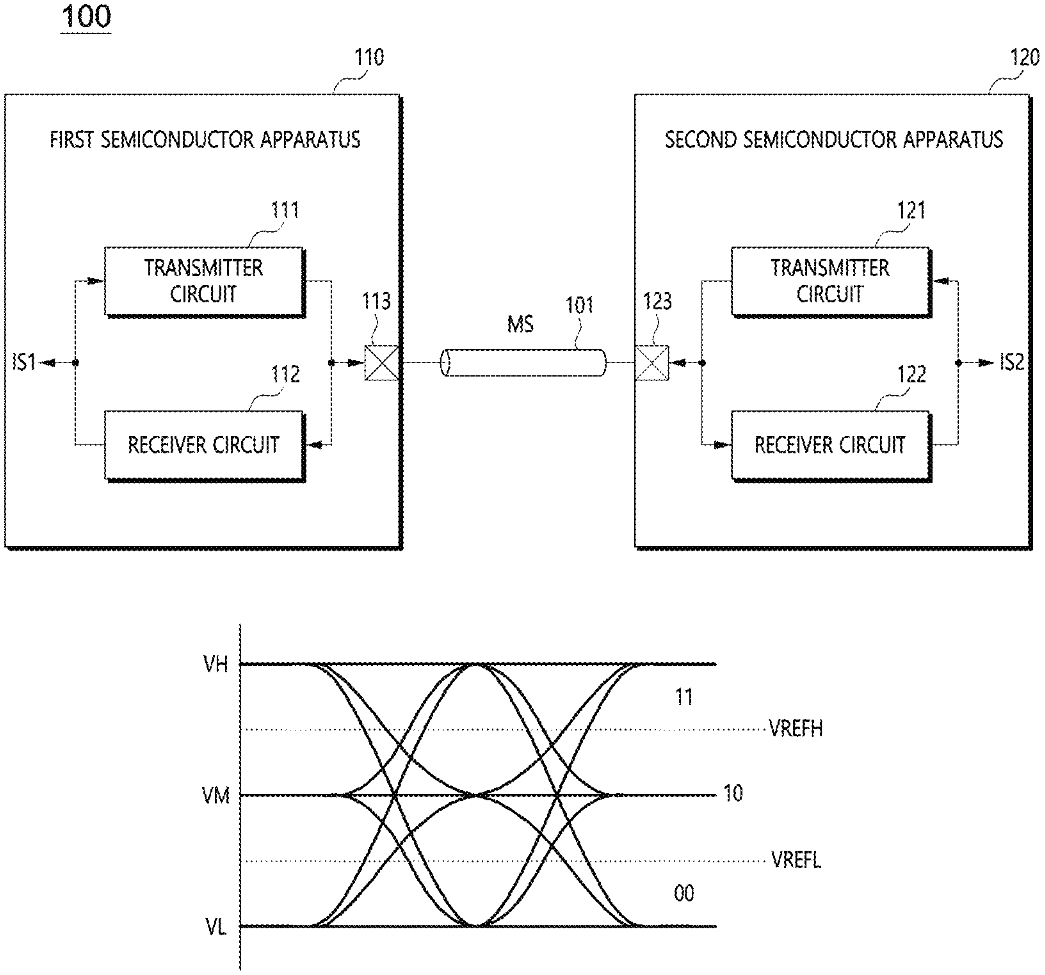
FIG. 1 is a diagram illustrating a configuration of a semiconductor system according to an embodiment.

FIG. 1 is a diagram illustrating a configuration of a semiconductor system 100 and a voltage level of a multi-level signal MS transmitted through a transmission signal bus 101 according to an embodiment. Referring to FIG. 1, the semiconductor system 100 may include a first semiconductor apparatus 110 and a second semiconductor apparatus 120. The first semiconductor apparatus 110 may be a master apparatus that provides various control signals required for the second semiconductor apparatus 120 to operate. The first semiconductor apparatus 110 may include various types of host devices. For example, the first semiconductor apparatus 110 may include at least one of a central processing unit (CPU), a graphic processing unit (GPU), a multi-media processor (MMP), a digital signal processor (DSP), an application processor (AP), and a memory controller. The second semiconductor apparatus 120 may be a slave apparatus capable of receiving the control signals from the first semiconductor apparatus 110 to perform various operations. For example, the second semiconductor apparatus 120 may be a memory apparatus, and the memory apparatus may include volatile memory and non-volatile memory. The volatile memory may include, for example but not limited to, SRAM (Static RAM), DRAM (Dynamic RAM), SDRAM (Synchronous DRAM), and the non-volatile memory may include ROM (Read Only Memory), PROM (Programmable ROM), EEPROM (Electrically Erasable and Programmable ROM), EPROM (Erasable and Programmable ROM), flash memory, PRAM (Phase change RAM), MRAM (Magnetic RAM), RRAM (Resistive RAM), and FRAM (Ferroelectric RAM).

The second semiconductor apparatus 120 may be coupled to the first semiconductor apparatus 110 through a plurality of buses. The plurality of buses may be signal transmission lines, links, or channels for transmitting signals. Although not shown, for example, the plurality of buses may include a clock bus, a command address bus, and a data bus, and the like. The clock bus and the command address bus may be unidirectional buses from the first semiconductor apparatus 110 to the second semiconductor apparatus 120, and the data bus may be bidirectional bus. The second semiconductor apparatus 120 may be coupled to the first semiconductor apparatus 110 through the transmission signal bus 101. The transmission signal bus 101 may include any kind of bus that transmits signal synchronized to a clock signal. For example, the transmission signal bus 101 may be a bidirectional bus, such as the data bus. In an embodiment, the transmission signal bus 101 may be a unidirectional bus, and technical ideas of the present disclosure may be similarly applicable when the transmission signal bus 101 is a unidirectional bus. The transmission signal bus 101 may be a multi-level signal transmission line transmitting the multi-level signal MS. For example, the multi-level signal MS may have at least three different voltage levels, and the multi-level signal MS may have a voltage level of one of the three different voltage levels according to a value of a symbol. The symbol may include at least two binary bits. The symbol may be a three-level symbol having at least a first state, a second state, and a third state. The first state may be a high state, and the symbol representing the first state may have a logic value of '1, 1'. For example, both a least significant bit and a most significant bit of the symbol representing the first state may be 1. The second state may be a middle state, and the symbol representing the second state may have a logic value of '1, 0'. A least significant bit of the symbol representing the second state may be 1 and a most significant bit may be 0. The third state may be a low state, and the symbol representing the third state may have a logic value of '0, 0'. Both a least significant bit and a most significant bit of the symbol representing the third state may be 0. The multi-level signal MS may have a first voltage level VH, a second voltage level VM, and a third voltage level VL.

A graph shown in FIG. 1 is a diagram illustrating a voltage level of the multi-level signal MS transmitted through the transmission signal bus 101. To transmit a symbol of the first state, the multi-level signal MS may have the first voltage level VH. To transmit a symbol of the second state, the multi-level signal MS may have the second voltage level VM. To transmit a symbol of the third state, the multi-level signal MS may have the third voltage level VL. The second voltage level VM may be lower than the first voltage level VH, and the third voltage level VL may be lower than the second voltage level VM. The multi-level signal MS may be maintained at current voltage level or may be changed to the other two voltage levels depending on whether a state of the symbol transitions. For example, when the symbol transitions from the second state to the third state, the multi-level signal MS may change from the second voltage level VM to the third voltage level VL. A voltage level of the multi-level signal MS and a state of the symbol may be determined using at least two reference voltages. The at least two reference voltages may include a first reference voltage VREFH and a second reference voltage VREFL. The first reference voltage VREFH may have a voltage level corresponding to a middle between the first voltage level VH and the second voltage level VM. The second reference voltage VREFL may have a voltage level corresponding to a middle between the second voltage level VM and the third voltage level VL. When the multi-level signal MS has a voltage level higher than the first reference voltage VREFH, the multi-level signal MS may be determined to represent a symbol of the first state. When the multi-level signal MS has a voltage level lower than the first reference voltage VREFH and higher than the second reference voltage VREFL, the multi-level signal MS may be determined to represent a symbol of the second state. When the multi-level signal MS has a voltage level lower than the second reference voltage VREFL, the multi-level signal MS may be determined to represent a symbol of the third state.

The first semiconductor apparatus 110 may include a transmitter circuit 111 and a receiver circuit 112. The transmitter circuit 111 and the receiver circuit 112 may be coupled with the transmission signal bus 101 through a pad 113. The transmitter circuit 111 may receive an internal signal IS1 of the first semiconductor apparatus 110, and transmit the multi-level signal MS generated based on the internal signal IS1 to the second semiconductor apparatus 120 through the pad 113 and the transmission signal bus 101. The receiver circuit 112 may receive the multi-level signal MS transmitted through the transmission signal bus 101 and the pad 113, and may generate the internal signal IS1 based on the multi-level signal MS. For example, the transmitter circuit 111 may generate the multi-level signal MS having a voltage level corresponding to one of the first to third voltages VH, VM, VL according to a state of a symbol generated based on a bit stream of the internal signal IS1. The transmitter circuit 111 may encode the bit stream of the internal signal IS1, which is a digital signal, to generate a symbol, and may convert the symbol into the multi-level signal MS, which is an analog voltage. The receiver circuit 112 may detect a voltage level of the multi-level signal MS to restore the symbol. The receiver circuit 112 may use the first and second reference voltages VREFH, VREFL to restore the symbol from the multi-level signal. The receiver circuit 112 may decode the symbol to generate the bit stream of the internal signal IS1.

The second semiconductor apparatus 120 may include a transmitter circuit 121 and a receiver circuit 122. The transmitter circuit 121 and the receiver circuit 122 may be coupled with the transmission signal bus 101 through a pad 123. The transmitter circuit 121 may receive an internal signal IS2 of the second semiconductor apparatus 120, and transmit the multi-level signal MS generated based on the internal signal IS2 to the first semiconductor apparatus 110 through the pad 123 and the transmission signal bus 101. The receiver circuit 122 may receive the multi-level signal MS transmitted through the transmission signal bus 101 and the pad 123, and may generate the internal signal IS2 based on the multi-level signal MS. For example, the transmitter circuit 121 may generate the multi-level signal MS having a voltage level corresponding to one of the first to third voltages VH, VM, VL according to a state of a symbol generated based on a bit stream of the internal signal IS2. The transmitter circuit 121 may encode the bit stream of the internal signal IS2, which is a digital signal, to generate the symbol, and may convert the symbol into the multi-level signal MS, which is an analog voltage. The receiver circuit 122 may detect a voltage level of the multi-level signal MS to restore the symbol. The receiver circuit 122 may use the first and second reference voltages VREFH, VREFL to restore the symbol from the multi-level signal. The receiver circuit 122 may decode the symbol to generate the bit stream of the internal signal IS2.

Figure 2:
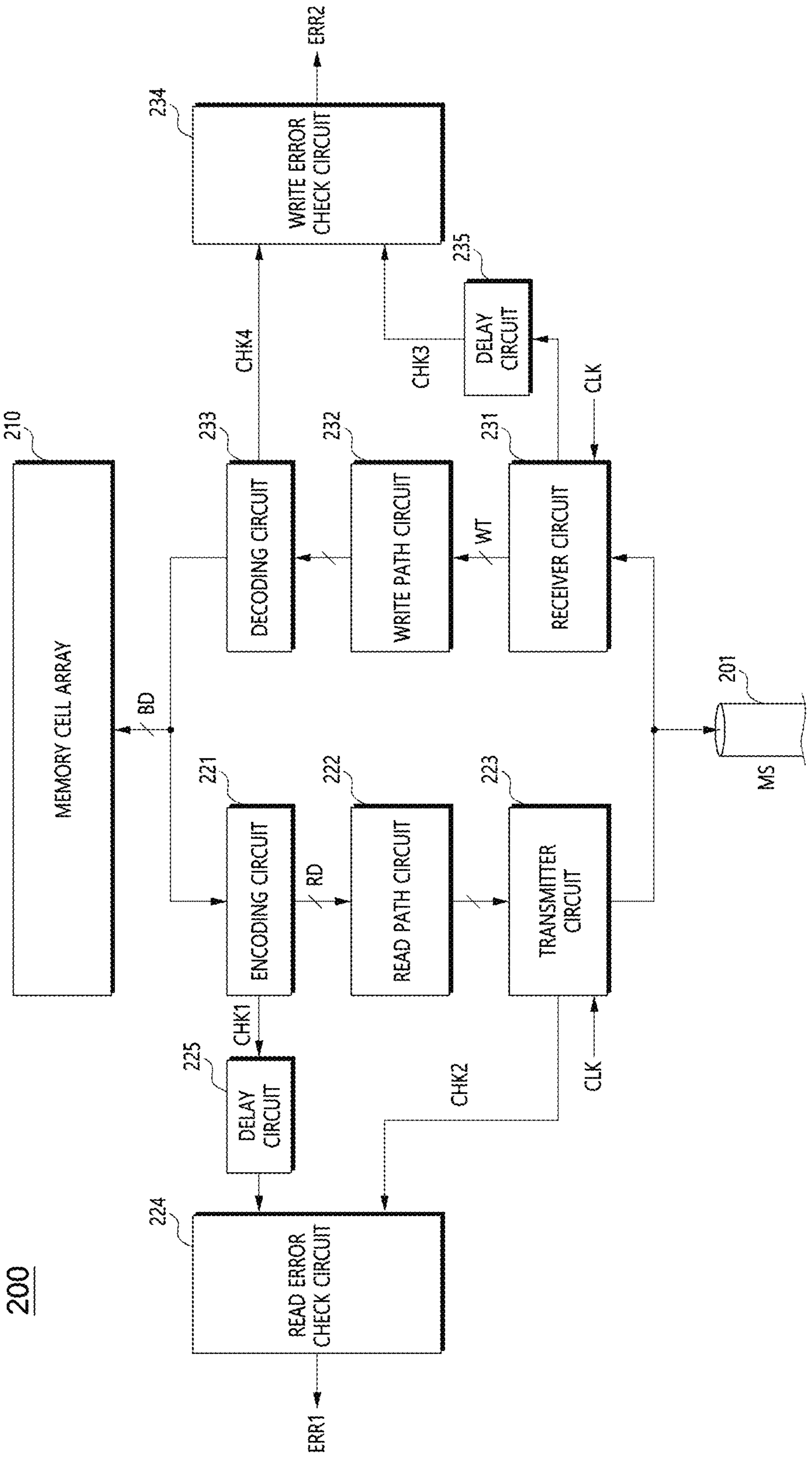
FIG. 2 is a diagram illustrating a configuration of a semiconductor memory apparatus according to an embodiment.

FIG. 2 is a diagram illustrating a configuration of a semiconductor memory apparatus 200 according to an embodiment. The semiconductor memory apparatus 200 may be applied as the second semiconductor apparatus 120 shown in FIG. 1. Referring to FIG. 2, the semiconductor memory apparatus 200 may detect and/or check for errors occurring in a data read path and a data write path. The semiconductor memory apparatus 200 may perform a read operation and a write operation. The read operation may refer to an operation in which the semiconductor memory apparatus 200 outputs data stored in the semiconductor memory apparatus 200 to an external device (e.g., the first semiconductor apparatus 110 of FIG. 1), and the write operation may refer to an operation in which the semiconductor memory apparatus 200 stores data received from the external device inside the semiconductor memory apparatus 200. The semiconductor memory apparatus 200 may include the data read path for transmitting read data to perform the read operation, and may include the data write path for transmitting write data to perform the write operation. The semiconductor memory apparatus 200 may detect and/or check for the error by comparing data at a start point of the data read path with data at an end point of the data read path. The semiconductor memory apparatus 200 may detect and/or check the error by comparing data at a start point of the data write path with data at an end point of the data write path.

The semiconductor memory apparatus 200 may include a memory cell array 210. The memory cell array 210 may include a plurality of memory cells. Although not shown, the memory cell array 210 may include a plurality of memory banks. A memory bank may be a unit of the memory cell array capable of performing independent data input/output operations. A plurality of bitlines and a plurality of wordlines may be arranged in the memory bank, and the plurality of memory cells may be coupled at points where the plurality of bitlines and the plurality of wordlines intersect. The memory cell array 210 may output data stored in the plurality of memory cells as bank data BD during the read operation. The memory cell array 210 may receive the bank data BD during the write operation, and may store the bank data BD in the plurality of memory cells. Although not shown, the memory cell array 210 may include various core circuits, such as bitline sense amplifiers to sense a plurality of bitlines associated with the memory cells, input/output sense amplifiers to receive or output the bank data BD, write drivers, and the like.

To perform the read operation, the semiconductor memory apparatus 200 may include an encoding circuit 221, a read path circuit 222, a transmitter circuit 223, and a read error check circuit 224. The encoding circuit 221 may receive the bank data BD output from the memory cell array 210. The encoding circuit 221 may generate a read symbol RD based on the bank data BD. The encoding circuit 221 may encode the bank data BD to generate the read symbol RD. For example, the bank data BD may be binary bits, and the read symbol RD may include a plurality of multi-level symbols. The encoding circuit 221 may encode a plurality of data signals of the bank data BD into the plurality of multi-level symbols. For example, the encoding circuit 221 may include, for example but not limited to, an 11b7s encoder capable of encoding an 11-bit data signal into seven symbols. One symbol may include two encoding bits, and may define three or four different states. In an embodiment, the encoding circuit 221 may include a plurality of encoders. For example, the encoding circuit 221 may include, for example but not limited to, a 3b2s encoder capable of encoding a 3-bit data signal into two symbols, a 5b2s encoder capable of encoding a 5-bit data signal into three symbols, and a 5b3s encoder capable of encoding a 5-bit data signal into three symbols. The 11b7s encoder may be configured with, for example but not limited to, two 3b2s encoders and one 5b3s encoder.

The encoding circuit 221 may generate a first check bit CHK1 from the read symbol RD. The encoding circuit 221 may provide at least one bit among bits of the read symbol RD as the first check bit CHK1. In an embodiment, the encoding circuit 221 may provide a result of a logic operation on a plurality of bits among bits of the read symbol RD as the first check bit CHK1. For example, when the symbol is a three-level symbol defining three different states, 11 binary bits can define a total of 2048 logic values, and seven symbols can provide a total of 2187 combinations, so that all 2048 logic values may be mapped to 2048 combinations. However, if an 11b7s encoder is configured with two 3b2s encoders and one 5b3s encoder, it might not be possible to map combinations of symbols to logic values of binary bits. For example, in the case of a 5b3s encoder, five binary bits define 32 logic values, while three symbols provide only 27 combinations, so there may be cases where five or more logic values are not mapped to combinations of symbols. Accordingly, the logic values of the unmapped binary bits may need to be encoded using an exceptional mapping, and a check signal may be used as a signal to identify whether it corresponds to the exceptional mapping. The check signal may be generated by performing a logic operation on a plurality of bits among bits of the read symbol RD, and the encoding circuit 221 may provide the check signal as the first check bit CHK1.

The read path circuit 222 may drive the read symbol RD to transmit the read symbol RD to the transmitter circuit 223. The read path circuit 222 may include a plurality of drivers and a plurality of signal transmission lines. The plurality of signal transmission lines may be disposed over a long distance from the encoding circuit 221 to the transmitter circuit 223 to transmit the read symbol RD to the transmitter circuit 223. Further, the plurality of drivers may drive the plurality of signal transmission lines such that bits of the read symbol RD are not lost on the plurality of signal transmission lines. For example, the plurality of drivers may be disposed at one or more critical points of the plurality of signal transmission lines. For example, the read path circuit 222 may include a latch circuit to latch the read symbol RD output from the encoding circuit 221, read global transmission lines to transmit the read symbol RD output from the latch circuit, and drivers and/or repeaters to drive voltage levels of the read global transmission lines.

The transmitter circuit 223 may receive the read symbol RD from the read path circuit 222. The transmitter circuit 223 may receive the read symbol RD transmitted from the encoding circuit 221 through the read path circuit 222. The transmitter circuit 223 may generate a multi-level signal MS based on the read symbol RD. The transmitter circuit 223 may align the read symbol RD and generate the multi-level signal MS based on the aligned read symbol. The transmitter circuit 223 may further receive a clock signal CLK. The transmitter circuit 223 may serialize the read symbol RD synchronously to the clock signal CLK. The transmitter circuit 223 may drive a data bus 201 based on the serialized read symbol, thereby outputting the multi-level signal MS through the data bus 201. The transmitter circuit 223 may include a pipe latch circuit for aligning the read symbol RD, a serializer for serializing the aligned read symbol, and a transmitter for driving the data bus 201 based on the serialized read symbol.

The transmitter circuit 223 may generate a second check bit CHK2 from the read symbol RD. The transmitter circuit 223 may provide at least one bit among bits of the read symbol RD as the second check bit CHK2. The sequence of the at least one bit provided by the transmitter circuit 223 as the second check bit CHK2 may be substantially the same as the sequence of the at least one bit provided by the encoding circuit 221 as the first check bit CHK1. In an embodiment, the transmitter circuit 223 may provide a result of a logic operation on a plurality of bits among bits of the read symbol RD as the second check bit CHK2. The sequence of the plurality of bits used by the transmitter circuit 223 to generate the second check bit CHK2 may be substantially the same as the sequence of the plurality of bits used by the encoding circuit 221 to generate the first check bit CHK1.

The read error check circuit 224 may receive the first check bit CHK1 from the encoding circuit 221 and may receive the second check bit CHK2 from the transmitter circuit 223. Based on the first and second check bits CHK1, CHK2, the read error check circuit 224 may determine whether an error has occurred in the transmission of the read symbol RD from the encoding circuit 221 to the transmitter circuit 223 through the read path circuit 222. The read error check circuit 224 may generate a read error signal ERR1 by comparing the first check bit CHK1 and the second check bit CHK2. The read error check circuit 224 may generate the read error signal ERR1 based on whether the first and second check bits CHK1, CHK2 have the same logic level, and based on a logic level of one of the first check bit CHK1 and the second check bit CHK2. The read error check circuit 224 may generate the read error signal ERR1 as a multi-level signal. The read error check circuit 224 may generate the read error signal ERR1 having different states and/or voltage levels depending on whether the first and second check bits CHK1, CHK2 have the same logic level and depending on a logic level of the first check bit CHK1. For example, when the first and second check bits CHK1, CHK2 have the same logic level, the read error check circuit 224 may generate the read error signal ERR1 having a first voltage level. When the first and second check bits CHK1, CHK2 have different logic levels and the first check bit CHK1 has a first logic level, the read error check circuit 224 may generate the read error signal ERR1 having a second voltage level. When the first and second check bits CHK1, CHK2 have different logic levels and the first check bit CHK1 has a second logic level, the read error check circuit 224 may generate the read error signal ERR1 having a third voltage level. The read error check circuit 224 may transmit the read error signal ERR1 to the external device. When the read error signal ERR1 has the second or third voltage level, it may be determined whether an error has occurred in the data read path and at which location in the data read path the error has occurred. For example, when the first and second check bits CHK1, CHK2 have an expected logic level of a first logic level and the first check bit CHK1 has a first logic level, and the second check bit CHK2 has a second logic level, it may be determined that the error has occurred in the read path circuit 222 and/or the transmitter circuit 223. When the first and second check bits CHK1, CHK2 have an expected logic level of a first logic level and the first check bit CHK1 has a second logic level, the error may be determined to have occurred in the encoding circuit 221 or in the memory cell array 210.

The semiconductor memory apparatus 200 may further include a delay circuit 225. The delay circuit 225 may be coupled between the encoding circuit 221 and the read error check circuit 224. The delay circuit 225 may regulate when the first check bit CHK1 is provided from the encoding circuit 221 to the read error check circuit 224. A delay time of the delay circuit 225 may be substantially the same as the time until the read symbol RD generated by the encoding circuit 221 reaches the transmitter circuit 223. In an embodiment, the delay circuit 225 may be a variable delay circuit having an adjustable delay time.

To perform the write operation, the semiconductor memory apparatus 200 may include a receiver circuit 231, the write path circuit 232, a decoding circuit 233, and a write error check circuit 234. The receiver circuit 231 may be coupled to the data bus 201 and may receive the multi-level signal MS transmitted through the data bus 201. The receiver circuit 231 may restore a plurality of multi-level symbols from the multi-level signal MS, and may align the plurality of symbols to generate a write symbol WT. The receiver circuit 231 may restore the plurality of symbols by comparing the multi-level signal MS to two or more reference voltages having different voltage levels. The receiver circuit 231 may receive the clock signal CLK and may deserialize the plurality of symbols in synchronization with the clock signal CLK. Further, the receiver circuit 231 may align the deserialized symbol and output the aligned symbol as the write symbol WT. The receiver circuit 231 may output the write symbol WT to the write path circuit 232. The receiver circuit 231 may include a receiver for comparing the multi-level signal MS with the two or more reference voltages to generate the plurality of symbols, a deserializer for deserializing the plurality of symbols, a pipe latch circuit for aligning the deserialized plurality of symbols, and the like.

The receiver circuit 231 may generate a third check bit CHK3 from the write symbol WT. The receiver circuit 231 may provide at least one bit among bits of the write symbol WT as the third check bit CHK3. In an embodiment, the receiver circuit 231 may provide a result of a logic operation on a plurality of bits among bits of the write symbol WT as the third check bit CHK3. For example, the third check bit CHK3 may be provided as the check signal used to identify whether the exceptional mapping has occurred.

The write path circuit 232 may drive the write symbol WT to transmit the write symbol WT to the decoding circuit 233. The write path circuit 232 may include a plurality of drivers and a plurality of signal transmission lines. The plurality of signal transmission lines may be disposed over a long distance from the receiver circuit 231 to the decoding circuit 233 to transmit the write symbol WT to the decoding circuit 233. Further, the plurality of drivers may drive the plurality of signal transmission lines such that bits of the write symbol WT are not lost on the plurality of signal transmission lines. For example, the plurality of drivers may be disposed at one or more critical points of the plurality of signal transmission lines. The write path circuit 232 may include write global transmission lines for transmitting the write symbol TW from the receiver circuit 231, drivers and/or repeaters for driving voltage levels of the write global transmission lines, and a latch circuit for latching the write symbol WT transmitted over the write global transmission lines.

The decoding circuit 233 may receive the write symbol WT from the write path circuit 232. The decoding circuit 233 may generate the bank data BD based on the write symbol WT. The decoding circuit 233 may generate the bank data BD by decoding the write symbol WT. For example, the decoding circuit 233 may include, for example but not limited to, a 7s11b decoder capable of decoding seven symbols into an 11-bit data signal. In an embodiment, the decoding circuit 233 may include a plurality of decoders. For example, the decoding circuit 233 may include, for example but not limited to, a 2s3b decoder capable of decoding two symbols into a 3-bit data signal, and a 3s5b decoder capable of decoding three symbols into a 5-bit data signal. The 7s11b decoder may be configured with, for example but not limited to, two 2s3b decoders and one 3s5b decoder.

The decoding circuit 233 may generate a fourth check bit CHK4 from the write symbol WT. The decoding circuit 233 may provide at least one bit among bits of the write symbol WT as the fourth check bit CHK4. The sequence of the at least one bit provided by the decoding circuit 233 as the fourth check bit CHK4 may be substantially the same as the sequence of the at least one bit provided by the receiver circuit 231 as the third check bit CHK3. In an embodiment, the decoding circuit 233 may provide a result of a logic operation on a plurality of bits among bits of the write symbol WT as the fourth check bit CHK4. The sequence of the plurality of bits used by the decoding circuit 233 to generate the fourth check bit CHK4 may be substantially the same as the sequence of the plurality of bits used by the receiver circuit 231 to generate the third check bit CHK3. The decoding circuit 233 may provide the bank data BD to the memory cell array 210, and the memory cell array 210 may store the bank data BD.

The write error check circuit 234 may receive the third check bit CHK3 from the receiver circuit 231, and may receive the fourth check bit CHK4 from the decoding circuit 233. Based on the third and fourth check bits CHK3, CHK4, the write error check circuit 234 may determine whether an error has occurred in the transmission of the write symbol WT from the receiver circuit 231 to the decoding circuit 233 through the write path circuit 232. The write error check circuit 234 may generate a write error signal ERR2 by comparing the third check bit CHK3 and the fourth check bit CHK4. The write error check circuit 234 may generate the write error signal ERR2 based on whether the third and fourth check bits CHK3, CHK4 have the same logic level, and based on a logic level of one of the third check bit CHK3 and the fourth check bit CHK4. The write error check circuit 234 may generate the write error signal ERR2 as a multi-level signal. The write error check circuit 234 may generate the write error signal ERR2 having different states depending on whether the third and fourth check bits CHK3, CHK4 have the same logic level and depending on a logic level of the third check bit CHK3. For example, when the third and fourth check bits CHK3, CHK4 have the same logic level, the write error check circuit 234 may generate the write error signal ERR2 having a first voltage level. When the third and fourth check bits CHK3, CHK4 have different logic levels and the third check bit CHK3 has a first logic level, the write error check circuit 234 may generate the write error signal ERR2 having a second voltage level. When the third and fourth check bits CHK3, CHK4 have different logic levels and the third check bit CHK3 has a second logic level, the write error check circuit 234 may generate the write error signal ERR2 having a third voltage level. The write error check circuit 234 may transmit the write error signal ERR2 to the external device. When the write error signal ERR2 has the second or third voltage level, it may be determined whether an error has occurred in the data write path and at which location in the data write path the error has occurred. For example, when the third and fourth check bits CHK3, CHK4 have an expected logic level of a first logic level and the third check bit CHK3 has a first logic level and the fourth check bit CHK4 has a second logic level, the error may be determined to have occurred in the write path circuit 232 and/or the decoding circuit 233. When the third and fourth check bits CHK3, CHK4 have an expected logic level of a first logic level and the third check bit CHK3 has a second logic level, the error may be determined to have occurred in the receiver circuit 231.

The semiconductor memory apparatus 200 may further include a delay circuit 235. The delay circuit 235 may be coupled between the receiver circuit 231 and the write error check circuit 234. The delay circuit 231 may regulate when the third check bit CHK3 is provided from the receiver circuit 231 to the write error check circuit 234. A delay time of the delay circuit 235 may be substantially the same as the time until the write symbol WT generated by the receiver circuit 231 reaches the decoding circuit 233. In an embodiment, the delay circuit 235 may be a variable delay circuit having an adjustable delay time.

Figure 3:
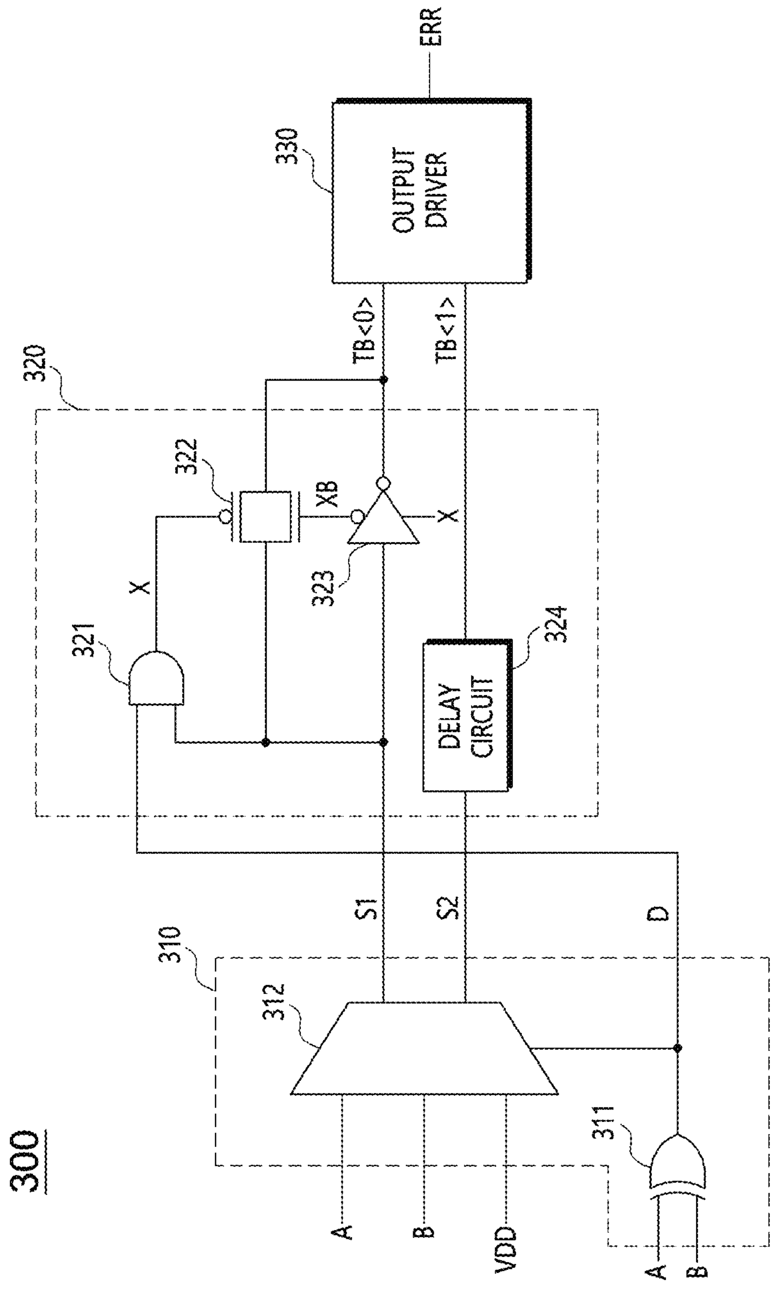
FIG. 3 is a diagram illustrating a configuration of an error check circuit according to an embodiment.

FIG. 3 is a diagram illustrating a configuration of an error check circuit 300 according to an embodiment. Referring to FIG. 3, the error check circuit 300 may receive a first input signal A and a second input signal B to generate an error signal ERR. The error check circuit 300 may be applied as the read error check circuit 224 and the write error check circuit 234 shown in FIG. 2, respectively. The first input signal A and the second input signal B may be signals corresponding to the respective check bits CHK1, CHK2, CHK3, CHK4 shown in FIG. 2. For example, when the error check circuit 300 is applied as the read error check circuit 224, the first input signal A may correspond to the first check bit CHK1, the second input signal B may correspond to the second check bit CHK2, and the error signal ERR may correspond to the read error signal ERR1. When the error check circuit 300 is applied as the write error check circuit 234, the first input signal A may correspond to the third check bit CHK3, the second input signal B may correspond to the fourth check bit CHK4, and the error signal ERR may correspond to the write error signal ERR2.

The error check circuit 300 may include a decision circuit 310, a symbol generation circuit 320, and an output driver 330. The decision circuit 310 may receive the first input signal A, the second input signal B, and a power supply voltage VDD. The power supply voltage VDD may have a voltage level sufficiently high to be determined to be a high logic level. The decision circuit 310 may generate a first selection signal S1 and a second selection signal S2 based on the logic levels of the first and second input signals A, B. When the first and second input signals A, B have the same logic level, the decision circuit 310 may output the first and second selection signals S1, S2 having the same voltage level. The decision circuit 310 may output the power supply voltage VDD to the first and second selection signals S1, S2 regardless of the logic levels of the first and second input signals A, B, and the first and second selection signals S1, S2 may both have high logic levels. When the first and second input signals A, B have different logic levels, the decision circuit 310 may output the first and second input signals A, B as the first and second selection signals S1, S2, respectively. The first selection signal S1 may have the same logic level as the first input signal A, and the second selection signal S2 may have the same logic level as the second input signal B.

The symbol generation circuit 320 may receive the first and second selection signals S1, S2 from the decision circuit 310. The symbol generation circuit 320 may generate a first transmission bit TB<0> and a second transmission bit TB<1> from the first and second selection signals S1, S2 based on whether the first and second input signals A, B have the same logic level and a logic level of the first selection signal S1. When the first and second input signals A, B have the same logic level, the symbol generation circuit 320 may output the first and second selection signals S1, S2 as the first and second transmission bits TB<0>, TB<1>, respectively. The first transmission bit TB<0> may have the same logic level as the first selection signal S1, and the second transmission bit TB<1> may have the same logic level as the second selection signal S2. When the first and second input signals A, B have different logic levels, and the first input signal A has a low logic level, the symbol generation circuit 320 may output the first selection signal S1 as the first transmission bit TB<0> and the second selection signal S2 as the second transmission bit TB<1>. When the first and second input signals A, B have different logic levels, and the first input signal A has a high logic level, the symbol generation circuit 320 may output the first transmission bit TB<0> having a logic level opposite to the first selection signal S1, and may output the second selection signal S2 as the second transmission bit TB<1>.

The output driver 330 may receive the first and second transmission bits TB<0>, TB<1> from the symbol generation circuit 320. The output driver 330 may generate the error signal ERR based on the first and second transmission bits TB<0>, TB<1>. The error signal ERR may be a multi-level signal having different voltage levels depending on logic levels of the first and second transfer bits TB<0>, TB<1>. When the first and second transmission bits TB<0>, TB<1> both have high logic levels, the output driver 330 may generate the error signal ERR having a first voltage level. When the first transmission bit TB<0> has a low logic level and the second transmission bit TB<1> has a high logic level, the output driver 330 may generate the error signal ERR having a second voltage level. When both the first and second transmission bits TB<0>, TB<1> have a low logic level, the output driver 330 may generate the error signal ERR having a third voltage level.

The decision circuit 310 may include an exclusive OR gate 311 and a multiplexer 312. The exclusive OR gate 311 may receive the first and second input signals A, B, and perform an exclusive OR operation on the first and second input signals A, B to generate a decision signal D. When the first and second input signals A, B have the same logic level, the decision signal D may have a low logic level. When the first and second input signals A, B have different logic levels, the decision signal D may have a high logic level. The multiplexer 312 may receive the first input signal A, the second input signal B, the power supply voltage VDD, and the decision signal D. Based on the decision signal D, the multiplexer 312 may generate the first and second selection signals S1, S2 from the first input signal A, the second input signal B, and the power supply voltage VDD. When the decision signal D is at a low logic level, the multiplexer 312 may output the power supply voltage VDD to the first and second selection signals S1, S2, respectively. When the decision signal D is at a high logic level, the multiplexer 312 may output the first and second input signals A, B to the first and second selection signals S1, S2, respectively.

The symbol generation circuit 320 may include an AND gate 321, a pass gate 322, an inverter 323, and a delay circuit 324. The AND gate 321 may receive the decision signal D and the first selection signal S1. The AND gate 321 may perform an AND operation on the decision signal D and the first selection signal S1 to generate a gate control signal X. When the decision signal D is at a low logic level or when the first selection signal S1 is at a low logic level, the AND gate 321 may generate the gate control signal X having a low logic level. When the decision signal D is at a high logic level and the first selection signal S1 is at a high logic level, the AND gate 321 may generate the gate control signal X having a high logic level. The pass gate 322 may connect the first selection signal S1 with the first transmission bit TB<0> based on the gate control signal X. A PMOS terminal of the pass gate 322 may receive the gate control signal X, and an NMOS terminal of the pass gate 322 may receive a complementary gate control signal XB. The complementary gate control signal XB is a signal having a logic level opposite to the gate control signal X, and may be generated by inverting the gate control signal X. When the gate control signal X has a low logic level, the pass gate 322 may output the first selection signal S1 as the first transmission bit TB<0>. When the gate control signal X has a high logic level, the pass gate 322 may block the first selection signal S1 from being output as the first transmission bit TB<0>. The inverter 323 may receive the gate control signal X. A PMOS terminal of the inverter 323 may receive the complementary gate control signal XB, and an NMOS terminal of the inverter 323 may receive the gate control signal X. When the gate control signal X has a high logic level, the inverter 323 is activated, and the inverter 323 may invert the first selection signal S1 to generate the first transmission bit TB<0>. When the gate control signal X has a low logic level, the inverter 323 may be deactivated. The delay circuit 324 may receive the second selection signal S2, and may delay the second selection signal S2 to generate the second transmission bit TB<1>. A delay time of the delay circuit 324 may correspond to a delay time caused by the pass gate 322 or by the inverter 323.

Figure 4:
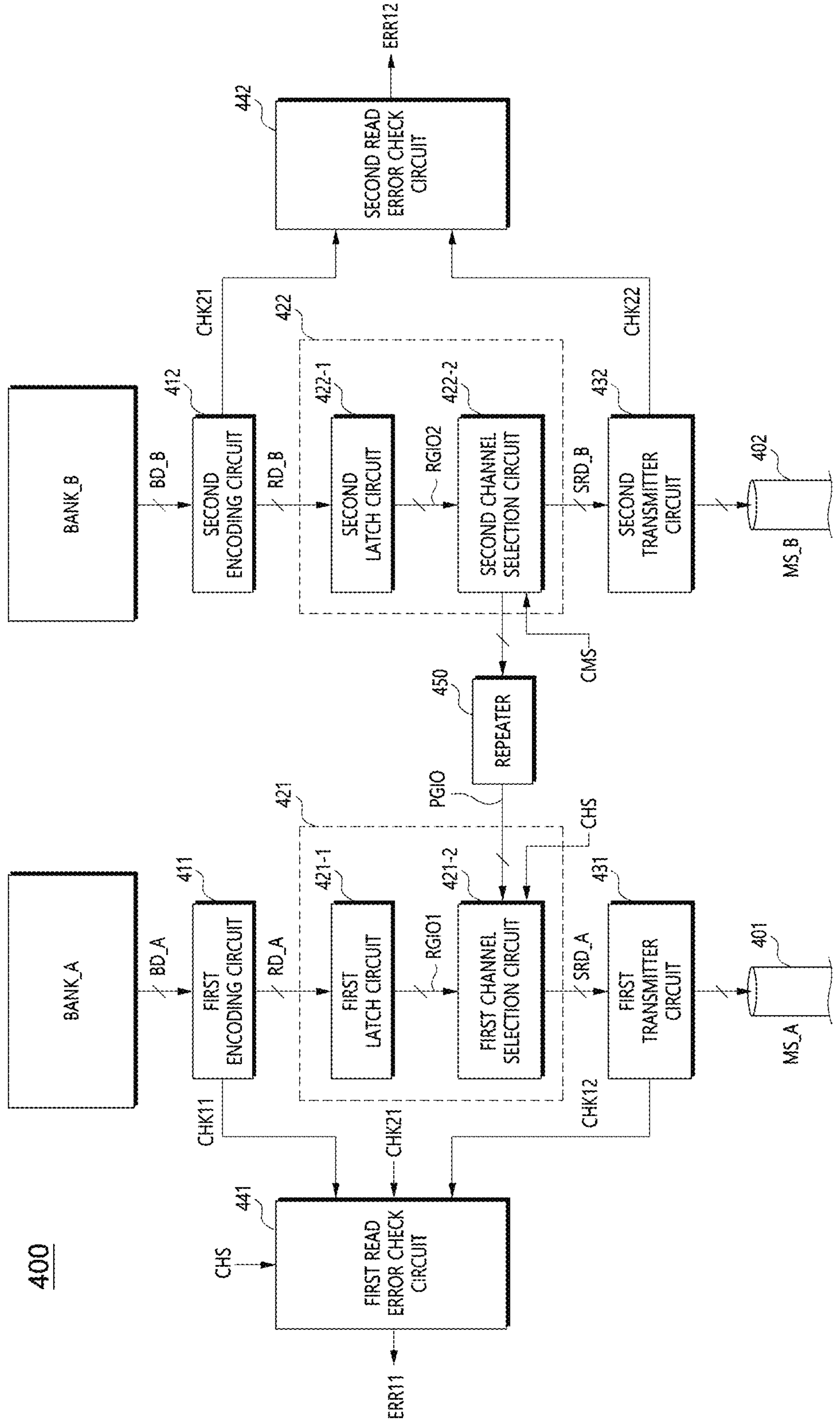
FIG. 4 is a diagram illustrating a configuration of a semiconductor memory apparatus according to an embodiment.

FIG. 4 is a diagram illustrating a configuration of a semiconductor memory apparatus 400 according to an embodiment. The semiconductor memory apparatus 400 may be applied as the second semiconductor apparatus 120 shown in FIG. 1. Referring to FIG. 4, the semiconductor memory apparatus 400 may include a first memory bank BANK_A and a second memory bank BANK_B. The first memory bank BANK_A may be a memory bank included in a first channel, and the second memory bank BANK_B may be a memory bank included in a second channel. The first and second channels may be capable of performing a read operation and a write operation independently of each other, and the first and second memory banks BANK_A, BANK_B may be memory cell arrays capable of performing a read operation and a write operation independently of each other. The first memory bank BANK_A may store first bank data BD_A in the read operation and output the first bank data BD_A in the write operation. The second memory bank BANK_B may store second bank data BD_B in the read operation, and may output the second bank data BD_B in the write operation. The semiconductor memory apparatus 400 may operate in a plurality of channel modes. For example, the semiconductor memory apparatus 400 may operate in a first channel mode and a second channel mode. A bandwidth of the semiconductor memory apparatus 400 in the first channel mode may be greater than a bandwidth of the semiconductor memory apparatus 400 in the second channel mode. In the first channel mode, the first and second memory banks BANK_A, BANK_B may perform the read operation and the write operation independently of each other. In the second channel mode, one of the first and second memory banks BANK_A, BANK_B may perform the read operation and the write operation.

The semiconductor memory apparatus 400 may include a first encoding circuit 411, a second encoding circuit 412, a first read path circuit 421, a second read path circuit 422, a first transmitter circuit 431, a second transmitter circuit 432, a first read error check circuit 441, and a second read error check circuit 442. The first encoding circuit 411 may be coupled with the first memory bank BANK_A to receive the first bank data BD_A from the first memory bank BANK_A. The first encoding circuit 411 may generate a first read symbol RD_A based on the first bank data BD_A. The first encoding circuit 411 may generate the first read symbol RD_A by encoding the first bank data BD_A. The first encoding circuit 411 may generate a first check bit CHK11 from the first read symbol RD_A. The first encoding circuit 411 may provide at least one bit among bits of the first read symbol RD_A as the first check bit CHK11. In an embodiment, the first encoding circuit 411 may provide a result of a logic operation on a plurality of bits among bits of the first read symbol RD_A as the first check bit CHK11. The first encoding circuit 411 may output the first read symbol RD_A to the first read path circuit 421. The first encoding circuit 411 may provide the first check bit CHK11 to the first read error check circuit 441.

The second encoding circuit 412 may be coupled to the second memory bank BANK_B to receive the second bank data BD_B from the second memory bank BANK_B. The second encoding circuit 412 may generate the second read symbol RD_B based on the second bank data BD_B. The second encoding circuit 412 may encode the second bank data BD_B to generate the second read symbol RD_B. The second encoding circuit 412 may generate a second check bit CHK21 from the second read symbol RD_B. The second encoding circuit 412 may provide at least one bit among bits of the second read symbol RD_B as the second check bit CHK21. In an embodiment, the second encoding circuit 412 may provide a result of a logic operation on a plurality of bits among bits of the second read symbol RD_B as the second check bit CHK21. The second encoding circuit 412 may output the second read symbol RD_B to the second read path circuit 422. The second encoding circuit 412 may provide the second check bit CHK21 to the second read error check circuit 442. Further, the second encoding circuit 412 may provide the second check bit CHK21 to the first read error check circuit 441.

The first read path circuit 421 may receive the first read symbol RD_A from the first encoding circuit 411, and may transmit the first read symbol RD_A to the first transmitter circuit 431. The second read path circuit 422 may receive the second read symbol RD_B from the second encoding circuit 412, and may transmit the second read symbol RD_B to the second transmitter circuit 432. In the first channel mode, the first read path circuit 421 may generate a first selected read symbol SRD_A from the first read symbol RD_A, and the second read path circuit 422 may generate a second selected read symbol SRD_B from the second read symbol RD_B. In the second channel mode, the first read path circuit 421 may generate the first selected read symbol SRD_A from one of the first and second read symbols RD_A, RD_B, and the second read path circuit 422 might not generate the second selected read symbol SRD_B. In the second channel mode, when a read operation of the first memory bank BANK_A is performed and a read operation of the second memory bank BANK_B is not performed, the first read path circuit 421 may generate the first selected read symbol SRD_A from the first read symbol RD_A, and may transmit the first selected read symbol SRD_A to the first transmitter circuit 431. In the second channel mode, when a read operation of the first memory bank BANK_A is not performed and a read operation of the second memory bank BANK_B is performed, the second read path circuit 422 may transmit the second read symbol RD_B to the first read path circuit 421. The first read path circuit 421 may generate the first selected read symbol SRD_A from the second read symbol RD_B, and may transmit the first selected read symbol SRD_A to the first transmitter circuit 431.

The first transmitter circuit 431 may receive the first selected read symbol SRD_A from the first read path circuit 421. The first transmitter circuit 431 may generate a first multi-level signal MS_A based on the first selected read symbol SRD_A. The first transmitter circuit 431 may be coupled to an external device (e.g., the first semiconductor apparatus 110 of FIG. 1) through a first data bus 401, and may transmit the first multi-level signal MS_A to the external device through the first data bus 401. The first transmitter circuit 431 may generate a third check bit CHK12 from the first selected read symbol SRD_A. The first transmitter circuit 431 may provide at least one bit among bits of the first selected read symbol SRD_A as the third check bit CHK12. The sequence of the at least one bit provided by the first transmitter circuit 431 as the third check bit CHK12 may be substantially the same as the sequence of the at least one bit provided by the first encoding circuit 411 as the first check bit CHK11 and/or the sequence of the at least one bit provided by the second encoding circuit 412 as the second check bit CHK21. In an embodiment, the first transmitter circuit 431 may provide a result of a logic operation on a plurality of bits among bits of the first selected read symbol SRD_A as the third check bit CHK12. The sequence of the plurality of bits used by the first transmitter circuit 431 to generate the third check bit CHK12 may be substantially the same as the sequence of the plurality of bits used by the first encoding circuit 411 to generate the first check bit CHK11 and/or the sequence of the plurality of bits used by the second encoding circuit 412 to generate the second check bit CHK21. The first transmitter circuit 431 may provide the third check bit CHK12 to the first read error check circuit 441.

The second transmitter circuit 432 may receive the second selected read symbol SRD_B from the second read path circuit 422. The second transmitter circuit 432 may generate a second multi-level signal MS_B based on the second selected read symbol SRD_B. The second transmitter circuit 432 may be coupled to the external device through the second data bus 402, and may transmit the second multi-level signal MS_B to the external device through the second data bus 402. The second transmitter circuit 432 may generate a fourth check bit CHK22 from the second selected read symbol SRD_B. The second transmitter circuit 432 may provide at least one bit among bits of the second selected read symbol SRD_B as the fourth check bit CHK22. The sequence of the at least one bit provided by the second transmitter circuit 432 as the fourth check bit CHK22 may be substantially the same as the sequence of the at least one bit provided by the second encoding circuit 412 as the second check bit CHK21. In an embodiment, the second transmitter circuit 432 may provide a result of a logic operation on a plurality of bits among bits of the second selected read symbol SRD_B as the fourth check bit CHK22. The sequence of the plurality of bits used by the second transmitter circuit 432 to generate the fourth check bit CHK22 may be substantially the same as the sequence of the plurality of bits used by the second encoding circuit 412 to generate the second check bit CHK21. The second transmitter circuit 432 may provide the fourth check bit CHK22 to the second read error check circuit 442.

The first read error check circuit 441 may receive the first check bit CHK11 from the first encoding circuit 411, receive the second check bit CHK21 from the second encoding circuit 412, and receive the third check bit CHK12 from the first transmitter circuit 431. The first read error check circuit 441 may generate a first read error signal ERR11 based on the first to third check bits CHK11, CHK21, CHK12. The first read error check circuit 441 may generate the first read error signal ERR11 by comparing one of the first and second check bits CHK11, CHK21 and the third check bit CHK12. The first read error check circuit 441 may further receive a channel selection signal CHS. The channel selection signal CHS may be a signal capable of identifying a channel performing the read operation and the write operation among the first and second channels in the second channel mode. For example, in the second channel mode, when the first channel and/or the first memory bank BANK_A performs the read operation and the write operation, the channel selection signal CHS may have a first logic level. In the second channel mode, when the second channel and/or the second memory bank BANK_B performs the read operation and the write operation, the channel selection signal CHS may have a second logic level. The first read error check circuit 441 may compare one of the first and second check bits CHK11, CHK21 with the third check bit CHK12 based on the channel selection signal CHS to generate the first read error signal ERR11. When the channel selection signal CHS has a first logic level, the first read error check circuit 441 may generate the first read error signal ERR11 by comparing the first check bit CHK11 with the third check bit CHK12. When the channel selection signal CHS has a second logic level, the first read error check circuit 441 may generate the first read error signal ERR11 by comparing the second check bit CHK21 with the third check bit CHK12.

The first read error check circuit 441 may generate the first read error signal ERR11 as a multi-level signal. The first read error check circuit 441 may transmit the first read error signal ERR11 to the external device. When the logic levels of one of the first and second check bits CHK11, CHK21 and the third check bit CHK12 are equal, the first read error check circuit 441 may generate the first read error signal ERR11 having a first voltage level. When the logic levels of one of the first and second check bits CHK11, CHK21 and the third check bit CHK12 are different and one of the first and second check bits CHK11, CHK21 has a first logic level, the first read error check circuit 441 may generate the first read error signal ERR11 having a second voltage level. When the logic levels of one of the first and second check bits CHK11, CHK21 and the third check bit CHK12 are different and one of the first and second check bits CHK11, CHK21 has a second logic level, the first read error check circuit 441 may generate the first read error signal ERR1 having a third voltage level.

The second read error check circuit 442 may receive the second check bit CHK21 from the second encoding circuit 412, and may receive the fourth check bit CHK22 from the second transmitter circuit 432. The second read error check circuit 442 may generate the second read error signal ERR12 based on the second and fourth check bits CHK21, CHK22. The second read error check circuit 442 may generate the second read error signal ERR12 by comparing the second check bit CHK21 and the fourth check bit CHK22. The second read error check circuit 442 may generate the second read error signal ERR12 as a multi-level signal. The second read error check circuit 442 may transmit the second read error signal ERR12 to the external device. When the second check bit CHK21 and the fourth check bit CHK22 have the same logic level, the second read error check circuit 442 may generate the second read error signal ERR12 having a first voltage level. When the logic levels of the second check bit CHK21 and the fourth check bit CHK22 are different and the second check bit CHK21 has a first logic level, the second read error check circuit 442 may generate the second read error signal ERR12 having a second voltage level. When the second check bit CHK21 and the fourth check bit CHK22 have different logic levels and the second check bit CHK21 has a second logic level, the second read error check circuit 442 may generate the second read error signal ERR12 having a third voltage level. The error check circuit 300 shown in FIG. 3 may be applied as the second read error check circuit 442. When the error check circuit 300 is applied as the second read error check circuit 442, the first input signal A may correspond to the second check bit CHK21, the second input signal B may correspond to the fourth check bit CHK22, and the error signal ERR may correspond to the second read error signal ERR12.

The semiconductor memory apparatus 400 may further include a repeater 450. The repeater 450 may be coupled between the first read path circuit 421 and the second read path circuit 422. The repeater 450 may transmit the second read symbol RD_B from the second read path circuit 422 to the first read path circuit 421. The second read symbol RD_B may be transmitted from the second read path circuit 422 to the first read path circuit 421 through the peripheral global transmission line PGIO. In an embodiment, the repeater 450 may be disposed on the peripheral global transmission line PGIO, and may drive a voltage level on the peripheral global transmission line PGIO to prevent or mitigate bits of the second read symbol RD_B from being lost on the peripheral global transmission line PGIO.

The first read path circuit 421 may include a first latch circuit 421-1 and a first channel selection circuit 421-2. The first latch circuit 421-1 may be coupled to the first encoding circuit 411, and may receive the first read symbol RD_A from the first encoding circuit 411. The first latch circuit 421-1 may latch the first read symbol RD_A and output a latched symbol to a first read global transmission line RGIO1. The first channel selection circuit 421-2 may be coupled to the first latch circuit 421-1 through the first read global transmission line RGIO1, and may receive the first read symbol RD_A through the first read global transmission line RGIO1. The first channel selection circuit 421-2 may receive the second read symbol RD_B from the second read path circuit 422. Further, the first channel selection circuit 421-2 may receive the channel selection signal CHS. Based on the channel selection signal CHS, the first channel selection circuit 421-2 may output one of the first read symbol RD_A and the second read symbol RD_B as the first selected read symbol SRD_A. When the channel selection signal CHS has a first logic level, the first channel selection circuit 421-2 may output the first read symbol RD_A transmitted through the first read global transmission line RGIO1 as the first selected read symbol SRD_A. When the channel selection signal CHS has a second logic level, the first channel selection circuit 421-2 may output the second read symbol RD_B transmitted from the second read path circuit 422 through the repeater 450 and the peripheral global transmission line PGIO as the first selected read symbol SRD_A.

The second read path circuit 422 may include a second latch circuit 422-1 and a second channel selection circuit 422-2. The second latch circuit 422-1 may be coupled to the second encoding circuit 412, and may receive the second read symbol RD_B from the second encoding circuit 412. The second latch circuit 422-1 may latch the second read symbol RD_B and output a latched symbol to a second read global transmission line RGIO2. The second channel selection circuit 422-2 may be coupled to the second latch circuit 422-1 through the second read global transmission line RGIO2, and may receive the second read symbol RD_B through the second read global transmission line RGIO2. Further, the second channel selection circuit 422-2 may receive a channel mode signal CMS. The channel mode signal CMS may be a signal capable of identifying whether the semiconductor memory apparatus is operating in any of the first channel mode and the second channel mode. For example, when the channel mode signal CMS has a first logic level, the semiconductor memory apparatus 400 may operate in the first channel mode. When the channel mode signal CMS has a second logic level, the semiconductor memory apparatus 400 may operate in the second channel mode. Based on the channel mode signal CMS, the second channel selection circuit 422-2 may output the second read symbol RD_B to the first read path circuit 421 or may output the second read symbol RD_B as the second selected read symbol SRD_B. For example, when the channel mode signal CMS has a first logic level, the second channel selection circuit 422-2 may output the second read symbol RD_B as the second selected read symbol SRD_B to the second transmitter circuit 432. When the channel mode signal CMS has a second logic level, the second channel selection circuit 422-2 may output the second read symbol RD_B to the first read path circuit 421. The second channel selection circuit 422-2 is coupled to the first channel selection circuit 421-2 through the peripheral global transmission line PGIO and the repeater 450, and may transmit the second read symbol RD_B to the first channel selection circuit 421-2 through the peripheral global transmission line PGIO and the repeater 450.

When the semiconductor memory apparatus 400 operates in the first channel mode, the first read error check circuit 441 may generate the first read error signal ERR11 by comparing the first and third check bits CHK11, CHK12, and the second read error check circuit 442 may generate the second read error signal ERR12 by comparing the second and fourth check bits CHK21, CHK22. When the first read error check circuit 441 generates the first read error signal ERR11 having the second voltage level, it may be determined that an error has occurred in the first read path circuit 421 and/or the first transmitter circuit 431. When the first read error check circuit 441 generates the first read error signal ERR11 having the third voltage level, it may be determined that an error has occurred in the first encoding circuit 411 and/or the first memory bank BANK_A. When the second read error check circuit 442 generates the second read error signal ERR12 having the second voltage level, it may be determined that an error has occurred in the second read path circuit 422 and/or the second transmitter circuit 432. When the second read error check circuit 442 generates the second read error signal ERR12 having the third voltage level, it may be determined that an error has occurred in the second encoding circuit 412 and/or the second memory bank BANK_B.

When the semiconductor memory apparatus 400 operates in the second channel mode, the first read error check circuit 441 may compare one of the first and second check bits CHK11, CHK21 with the third check bit CHK12 to generate the first read error signal ERR11. The second read error check circuit 442 might not generate the second read error signal ERR12. When a read operation of the first memory bank BANK_A is performed, the first read error check circuit 441 may generate the first read error signal ERR11 by comparing the first and third check bits CHK11, CHK12. When a read operation of the second memory bank BANK_B is performed, the first read error check circuit 441 may compare the second and third check bits CHK21, CHK12 to generate the first read error signal ERR11. When the first read error check circuit 441 generates the first read error signal ERR11 having the second voltage level, it may be determined that an error has occurred in the second read path circuit 422, the repeater 450, the peripheral global transmission line PGIO, and/or the first transmitter circuit 431. When the first read error check circuit 441 generates the first read error signal ERR11 having the third voltage level, it may be determined that an error has occurred in the second encoding circuit 412 and/or the second memory bank BANK_B.

Figure 5:
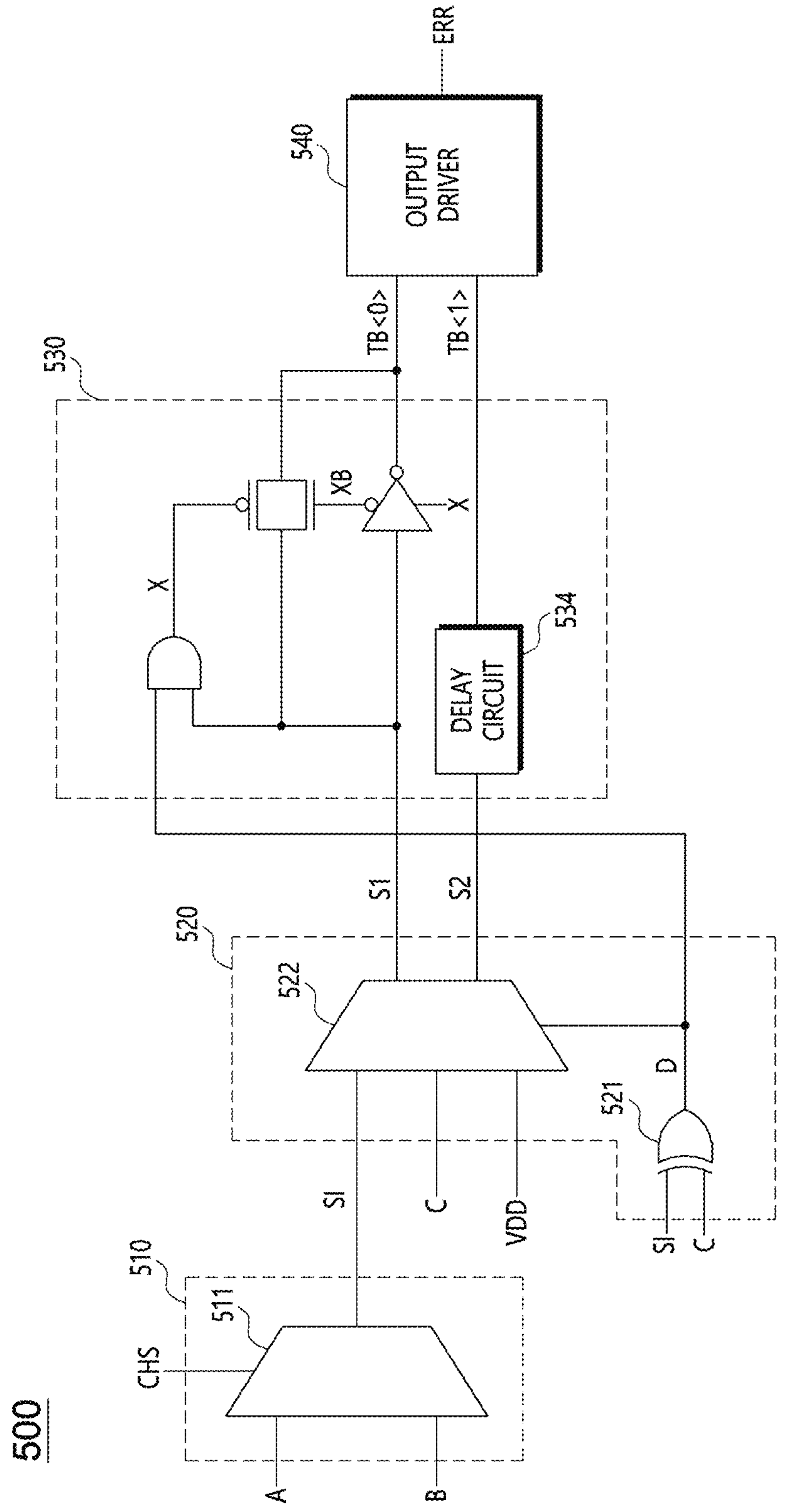
FIG. 5 is a diagram illustrating a configuration of an error check circuit according to an embodiment.

FIG. 5 is a diagram illustrating a configuration of an error check circuit 500 according to an embodiment. Referring to FIG. 5, the error check circuit 500 may generate an error signal ERR by receiving a first input signal A, a second input signal B, and a third input signal C. The error check circuit 500 may be applied as the first read error check circuit 441 shown in FIG. 4. When the error check circuit 500 is applied as the first read error check circuit 441, the first input signal A may correspond to the first check bit CHK11, the second input signal B may correspond to the second check bit CHK21, the third input signal C may correspond to the third check bit CHK12, and the error signal ERR may correspond to the first read error signal ERR11.

The error check circuit 500 may include an input selection circuit 510, a decision circuit 520, a symbol generation circuit 530, and an output driver 540. The input selection circuit 510 may receive the first input signal A, the second input signal B, and the channel selection signal CHS. The input selection circuit 510 may output one of the first and second input signals A, B as a selected input signal SI based on the channel selection signal CHS. For example, when the channel selection signal CHS has a first logic level, the input selection circuit 510 may output the first input signal A as the selected input signal SI. When the channel selection signal CHS has a second logic level, the input selection circuit 510 may output the second input signal B as the selected input signal SI.

The decision circuit 520 may receive the selected input signal SI, the third input signal C, and a power supply voltage VDD. The power supply voltage VDD may have a voltage level sufficiently high to be determined to be a high logic level. The decision circuit 520 may generate a first selection signal S1 and a second selection signal S2 based on the logic levels of the selected input signal SI and the third input signal C. When the logic levels of the selected input signal SI and the third input signal C are the same, the decision circuit 520 may output the first and second selection signals S1, S2 having the same voltage level. The decision circuit 520 may output the power supply voltage VDD to the first and second selection signals S1, S2 regardless of the logic levels of the selected input signal SI and the third input signal C, and the first and second selection signals S1, S2 may both have a high logic level. When the selected input signal SI and the third input signal C have different logic levels, the decision circuit 520 may output the selected input signal SI and the third input signal C as the first and second selection signals S1, S2, respectively. The first selection signal S1 may have the same logic level as the selected input signal SI, and the second selection signal S2 may have the same logic level as the third input signal C.

The symbol generation circuit 530 may receive the first and second selection signals S1, S2, and generate a first transmission bit TB<0> and a second transmission bit TB<1> based on the first and second selection signals S1, S2 and whether the selected input signal I and the third input signal C have the same logic level. The output driver 540 may receive the first and second transmission bits TB<0>, TB<1>, and may generate the error signal ERR based on the first and second transmission bits TB<0>, TB<1>. The symbol generation circuit 530 and the output driver 540 may be identical to the symbol generation circuit 320 and the output driver 330 shown in FIG. 3, and redundant description of the same components will be omitted.

The input selection circuit 510 may include a first multiplexer 511. The first multiplexer 511 may receive the first input signal A, the second input signal B, and the channel selection signal CHS. Based on the channel selection signal CHS, the first multiplexer 511 may output one of the first and second input signals A, B as the selected input signal SI. When the channel selection signal CHS has a low logic level, the first multiplexer 511 may output the first input signal A as the selected input signal SI. When the channel selection signal CHS has a high logic level, the first multiplexer 511 may output the second input signal B as the selected input signal SI.

The decision circuit 520 may include an exclusive OR gate 521 and a second multiplexer 522. The exclusive OR gate 521 may receive the selected input signal SI and the third input signal C, and may perform an exclusive OR operation on the selected input signal SI and the third input signal C to generate a decision signal D. When the selected input signal SI and the third input signal C have the same logic level, the decision signal D may have a low logic level. When the selected input signal SI and the third input signal C have different logic levels, the decision signal D may have a high logic level. The second multiplexer 522 may receive the selected input signal SI, the third input signal C, the power supply voltage VDD, and the decision signal D. The second multiplexer 522 may generate the first and second selection signals S1, S2 from the selected input signal SI, the third input signal C, and the power supply voltage VDD based on the decision signal D. When the decision signal D is at a low logic level, the second multiplexer 522 may output the power supply voltage VDD to the first and second selection signals S1, S2, respectively. When the decision signal D is at a high logic level, the second multiplexer 522 may output the selected input signal SI and the third input signal C as the first and second selection signals S1, S2, respectively.

Figure 6:
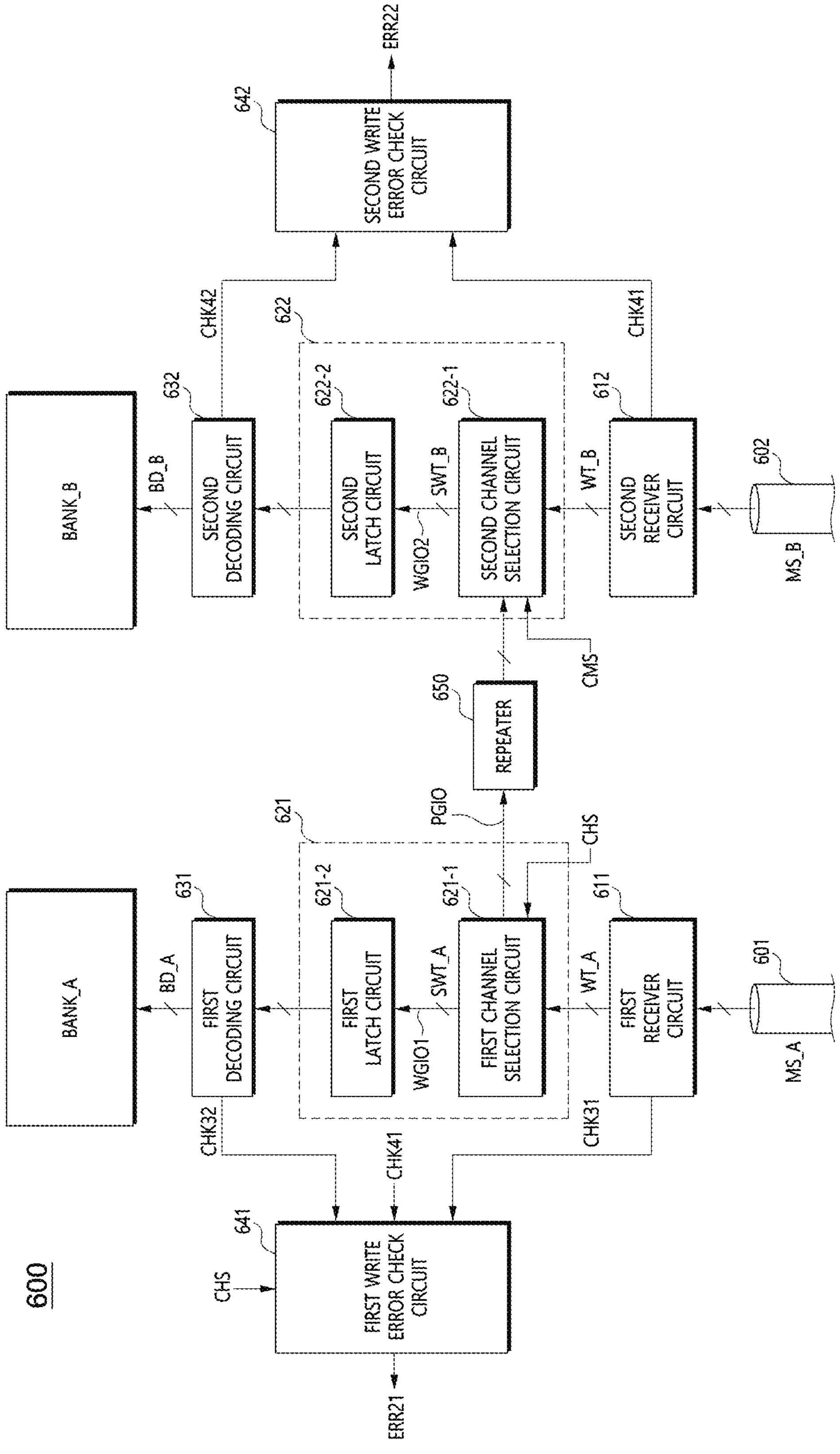
FIG. 6 is a diagram illustrating a configuration of a semiconductor memory apparatus according to an embodiment.

FIG. 6 is a diagram illustrating a configuration of a semiconductor memory apparatus 600 according to an embodiment. The semiconductor memory apparatus 600 may be applied as the second semiconductor apparatus 120 shown in FIG. 1. Referring to FIG. 6, the semiconductor memory apparatus 600 may include a first memory bank BANK_A and a second memory bank BANK_B. The first memory bank BANK_A may be a memory bank included in a first channel, and the second memory bank BANK_B may be a memory bank included in a second channel. The first and second channels may be capable of performing a read operation and a write operation independently of each other, and the first and second memory banks BANK_A, BANK_B may be memory cell arrays capable of performing the read operation and the write operation independently of each other. The first memory bank BANK_A may store first bank data BD_A in the read operation and output the first bank data BD_A in the write operation. The second memory bank BANK_B may store the second bank data BD_B in the read operation, and may output the second bank data BD_B in the write operation. The semiconductor memory apparatus 600 may operate in a plurality of channel modes. For example, the semiconductor memory apparatus 600 may operate in a first channel mode and a second channel mode. A bandwidth of the semiconductor memory apparatus 600 in the first channel mode may be greater than a bandwidth of the semiconductor memory apparatus 600 in the second channel mode. In the first channel mode, the first and second memory banks BANK_A, BANK_B may perform the read operation and the write operation independently of each other. In the second channel mode, a memory bank of one of the first and second memory banks BANK_A, BANK_B may perform the read operation and the write operation.

The semiconductor memory apparatus 600 may include a first receiver circuit 611, a second receiver circuit 612, a first write path circuit 621, a second write path circuit 622, a first decoding circuit 631, a second decoding circuit 632, a first write error check circuit 641, and a second write error check circuit 642. The first receiver circuit 611 may be coupled to an external device (e.g., the first semiconductor apparatus 110 of FIG. 1) through the first data bus 601, and may receive a first multi-level signal MS_A through the first data bus 601. The first receiver circuit 611 may generate a first write symbol WT_A based on the first multi-level signal MS_A. The first receiver circuit 611 may generate a first check bit CHK31 from the first write symbol WT_A. The first receiver circuit 611 may provide at least one bit among bits of the first write symbol WT_A as the first check bit CHK31. In an embodiment, the first receiver circuit 611 may provide a result of a logic operation on a plurality of bits among bits of the first write symbol WT_A as the first check bit CHK31. The first receiver circuit 611 may output the first write symbol WT_A to the first write path circuit 621. The first receiver circuit 611 may provide the first check bit CHK31 to the first write error check circuit 641.

The second receiver circuit 612 may be coupled to the external device through the second data bus 602, and may receive a second multi-level signal MS_B through the second data bus 602. The second receiver circuit 612 may generate a second write symbol WT_B based on the second multi-level signal MS_B. The second receiver circuit 612 may generate a second check bit CHK41 from the second write symbol WT_B. The second receiver circuit 612 may provide at least one bit among bits of the second write symbol WT_B as the second check bit CHK41. In an embodiment, the second receiver circuit 612 may provide a result of a logic operation on a plurality of bits among bits of the second write symbol WT_B as the second check bit CHK41. The second receiver circuit 612 may output the second write symbol WT_B to the second write path circuit 622. The second receiver circuit 612 may provide the second check bit CHK41 to the second write error check circuit 642.

The first write path circuit 621 may receive the first write symbol WT_A from the first receiver circuit 611, and may transmit the first write symbol WT_A to the first decoding circuit 631. The second write path circuit 622 may receive the second write symbol WT_B from the second receiver circuit 612, and may transmit the second write symbol WT_B to the second decoding circuit 632. In the first channel mode, the first write path circuit 621 may generate a first selected write symbol SWT_A from the first write symbol WT_A, and the second write path circuit 622 may generate a second selected write symbol SWT_B from the second write symbol WT_B. In the second channel mode, one of the first write path circuit 621 and the second write path circuit 622 may generate a selected write symbol from the first write symbol WT_A. In the second channel mode, when a write operation of the first memory bank BANK_A is performed and a write operation of the second memory bank BANK_B is not performed, the first write path circuit 621 may generate the first selected write symbol SWT_A from the first write symbol WT_A, and may transmit the first selected write symbol SWT_A to the first decoding circuit 631. In the second channel mode, when the write operation of the first memory bank BANK_A is not performed and the write operation of the second memory bank BANK_B is performed, the first write path circuit 621 may transmit the first write symbol WT_A to the second write path circuit 622. The second write path circuit 622 may generate the second selected write symbol SWT_B from the first write symbol WT_A, and may transmit the second selected write symbol SWT_B to the second decoding circuit 632.

The first decoding circuit 631 may receive the first selected write symbol SWT_A from the first write path circuit 621. The first decoding circuit 631 may generate the first bank data BD_A based on the first selected write symbol SWT_A. The first decoding circuit 631 may generate the first bank data BD_A by decoding the first selected write symbol SWT_A. The first decoding circuit 631 may provide the first bank data BD_A to the first memory bank BANK_A. The first decoding circuit 631 may generate a third check bit CHK32 from the first selected write symbol SWT_A. The first decoding circuit 631 may provide at least one bit among bits of the first selected write symbol SWT_A as the third check bit CHK32. The sequence of the at least one bit provided by the first decoding circuit 631 as the third check bit CHK32 may be substantially the same as the sequence of the at least one bit provided by the first receiver circuit 611 as the first check bit CHK31 and/or the sequence of the at least one bit provided by the second receiver circuit 612 as the second check bit CHK41. In an embodiment, the first decoding circuit 631 may provide a result of a logic operation on a plurality of bits among bits of the first selected write symbol SWT_A as the third check bit CHK32. The sequence of the plurality of bits used by the first decoding circuit 631 to generate the third check bit CHK32 may be substantially the same as the sequence of the plurality of bits used by the first receiver circuit 611 to generate the first check bit CHK31 and/or the sequence of the plurality of bits used by the second receiver circuit 612 to generate the second check bit CHK41. The first decoding circuit 631 may provide the third check bit CHK32 to the first write error check circuit 641.

The second decoding circuit 632 may receive the second selected write symbol SWT_B from the second write path circuit 622. The second decoding circuit 632 may generate the second bank data BD_B based on the second selected write symbol SWT_B. The second decoding circuit 632 may generate the second bank data BD_B by decoding the second selected write symbol SWT_B. The second decoding circuit 632 may provide the second bank data BD_B to the second memory bank BANK_B. The second decoding circuit 632 may generate a fourth check bit CHK42 from the second selected write symbol SWT_B. The second decoding circuit 632 may provide at least one bit among bits of the second selected write symbol SWT_B as the fourth check bit CHK42. The sequence of the at least one bit provided by the second decoding circuit 632 as the fourth check bit CHK42 may be substantially the same as the sequence of the at least one bit provided by the second receiver circuit 612 as the second check bit CHK41. In an embodiment, the second decoding circuit 632 may provide a result of a logic operation on a plurality of bits among bits of the second selected write symbol SWT_B as the fourth check bit CHK42. The sequence of the plurality of bits used by the second decoding circuit 632 to generate the fourth check bit CHK42 may be substantially the same as the sequence of the plurality of bits used by the second receiver circuit 612 to generate the second check bit CHK41. The second decoding circuit 632 may provide the fourth check bit CHK42 to the second write error check circuit 642.

The first write error check circuit 641 may receive the first check bit CHK31 from the first receiver circuit 611, receive the second check bit CHK41 from the second receiver circuit 612, and receive the third check bit CHK32 from the first decoding circuit 631. The first write error check circuit 641 may generate the first write error signal ERR21 based on the first to third check bits CHK31, CHK41, CHK32. The first write error check circuit 641 may generate the first write error signal ERR21 by comparing one of the first and second check bits CHK31, CHK41 and the third check bit CHK32. The first write error check circuit 641 may further receive a channel selection signal CHS. Based on the channel selection signal CHS, the first write error check circuit 641 may compare one of the first and second check bits CHK31, CHK41 with the third check bit CHK32 to generate the first write error signal ERR21. When the channel selection signal CHS has a first logic level, the first write error check circuit 641 may generate the first write error signal ERR21 by comparing the first check bit CHK31 with the third check bit CHK32. When the channel selection signal CHS has a second logic level, the first write error check circuit 641 may generate the first write error signal ERR21 by comparing the second check bit CHK41 and the third check bit CHK32.

The first write error check circuit 641 may generate the first write error signal ERR21 as a multi-level signal. The first write error check circuit 641 may transmit the first write error signal ERR21 to the external device. When one of the first and second check bits CHK31, CHK41 and the third check bit CHK32 have the same logic level, the first write error check circuit 641 may generate the first write error signal ERR21 having a first voltage level. When the logic levels of one of the first and second check bits CHK31, CHK41 and the third check bit CHK32 are different and one of the first and second check bits CHK31, CHK41 has a first logic level, the first write error check circuit 641 may generate the first write error signal ERR21 having a second voltage level. When the logic levels of one of the first and second check bits CHK31, CHK41 and the third check bit CHK32 are different and one of the first and second check bits CHK31, CHK41 has a second logic level, the first write error check circuit 641 may generate the first write error signal ERR21 having a third voltage level. The error check circuit 500 shown in FIG. 5 may be applied as the first write error check circuit 641. When the error check circuit 500 is applied as the first write error check circuit 641, the first input signal A may correspond to the first check bit CHK31, the second input signal B may correspond to the second check bit CHK41, the third input signal C may correspond to the third check bit CHK32, and the error signal ERR may correspond to the first write error signal ERR21.

The second write error check circuit 642 may receive the second check bit CHK41 from the second receiver circuit 612, and may receive the fourth check bit CHK42 from the second decoding circuit 632. The second write error check circuit 642 may generate the second write error signal ERR22 based on the second and fourth check bits CHK41, CHK42. The second write error check circuit 642 may generate the second write error signal ERR22 by comparing the second check bit CHK41 and the fourth check bit CHK42. The second write error check circuit 642 may generate the second write error signal ERR22 as a multi-level signal. The second write error check circuit 642 may transmit the second write error signal ERR22 to the external device. When the second check bit CHK41 and the fourth check bit CHK42 have the same logic level, the second write error check circuit 642 may generate the second write error signal ERR22 having a first voltage level. When the logic levels of the second check bit CHK41 and the fourth check bit CHK42 are different and the second check bit CHK41 has a first logic level, the second write error check circuit 642 may generate the second write error signal ERR22 having a second voltage level. When the logic levels of the second check bit CHK41 and the fourth check bit CHK42 are different and the second check bit CHK41 has a second logic level, the second write error check circuit 642 may generate the second write error signal ERR22 having a third voltage level. The error check circuit 300 shown in FIG. 3 may be applied as the second write error check circuit 642. When the error check circuit 300 is applied as the second write error check circuit 642, the first input signal A may correspond to the second check bit CHK41, the second input signal B may correspond to the fourth check bit CHK42, and the error signal ERR may correspond to the second write error signal ERR22.

The semiconductor memory apparatus 600 may further include a repeater 650. The repeater 650 may be coupled between the first write path circuit 621 and the second write path circuit 622. The repeater 650 may transmit the first write symbol WT_A from the first write path circuit 621 to the second write path circuit 622. The first write symbol WT_A may be transmitted from the first write path circuit 621 to the second write path circuit 622 through a peripheral global transmission line PGIO. In an embodiment, the repeater 650 may be disposed on the peripheral global transmission line PGIO and may drive a voltage level on the peripheral global transmission line PGIO to prevent or mitigate bits of the first write symbol WT_A from being lost on the peripheral global transmission line PGIO.

The first write path circuit 621 may include a first channel selection circuit 621-1 and a first latch circuit 621-2. The first channel selection circuit 621-1 may receive the first write symbol WT_A from the first receiver circuit 611. The first channel selection circuit 621-1 may receive the channel selection signal CHS. Based on the channel selection signal CHS, the first channel selection circuit 621-1 may generate the first selected write symbol SWT_A from the first write symbol WT_A or transmit the first write symbol WT_A to the second write path circuit 622. When the channel selection signal CHS has a first logic level, the first channel selection circuit 621-1 may output the first write symbol WT_A as the first selected write symbol SWT_A. The first channel selection circuit 621-1 may transmit the first selected write symbol SWT_A to the first latch circuit 621-2 through a first write global transmission line WGIO1. When the channel selection signal CHS has a second logic level, the first channel selection circuit 621-1 may output the first write symbol WT_A to the second write path circuit 622. The first channel selection circuit 621-1 may transmit the first write symbol WT_A to the second write path circuit 622 through the peripheral global transmission line PGIO and the repeater 650. The first latch circuit 621-2 is coupled to the first write global transmission line WGIO1, and may receive the first selected write symbol SWT_A transmitted from the first channel selection circuit 621-1 through the first write global transmission line WGIO1. The first latch circuit 621-2 may latch the first selected write symbol SWT_A and output a latched symbol to the first decoding circuit 631.

The second write path circuit 622 may include a second channel selection circuit 622-1 and a second latch circuit 622-2. The second channel selection circuit 622-1 may receive the second write symbol WT_B from the second receiver circuit 612. The second channel selection circuit 622-1 may receive the first write symbol WT_A from the first write path circuit 621. Further, the second channel selection circuit 622-1 may receive a channel mode signal CMS. Based on the channel mode signal CMS, the second channel selection circuit 622-1 may generate the second selected write symbol SWT_B from one of the first write symbol WT_A and the second write symbol WT_B. When the channel mode signal CMS has a first logic level, the second channel selection circuit 622-1 may output the first write symbol WT_A as the second selected write symbol SWT_B. When the channel mode signal CMS has a second logic level, the second channel selection circuit 622-1 may output the second write symbol WT_B as the second selected write symbol SWT_B. The second channel selection circuit 622-1 may transmit the second selected write symbol SWT_B to the second latch circuit 622-2 through a second write global transmission line WGIO2. The second latch circuit 622-2 may be coupled to the second write global transmission line WGIO2 and may receive the second selected write symbol SWT_B transmitted from the second channel selection circuit 622-1 through the second write global transmission line WGIO2. The second latch circuit 622-2 may latch the second selected write symbol SWT_B, and output a latched symbol to the second decoding circuit 632.

When the semiconductor memory apparatus 600 operates in the first channel mode, the first write error check circuit 641 may compare the first and third check bits CHK31, CHK32 to generate the first write error signal ERR21, and the second write error check circuit 642 may compare the second and fourth check bits CHK41, CHK42 to generate the second write error signal ERR22. When the first write error check circuit 641 generates the first write error signal ERR21 having the second voltage level, it may be determined that an error has occurred in the first write path circuit 621 and/or the first decoding circuit 631. When the first write error check circuit 641 generates the first write error signal ERR21 having the third voltage level, it may be determined that an error has occurred in the first receiver circuit 611. When the second write error check circuit 642 generates the second write error signal ERR22 having the second voltage level, it may be determined that an error has occurred in the second write path circuit 622 and/or the second decoding circuit 632. When the second write error check circuit 642 generates the second write error signal ERR22 having the third voltage level, it may be determined that an error has occurred in the second receiver circuit 612.

When the semiconductor memory apparatus 600 operates in the second channel mode, the first write error check circuit 641 may generate the first write error signal ERR21 by comparing one of the first and second check bits CHK31, CHK41 with the third check bit CHK32. The second write error check circuit 642 might not generate the second write error signal ERR22. When a write operation of the first memory bank BANK_A is performed, the first write error check circuit 641 may generate the first write error signal ERR21 by comparing the first and third check bits CHK31, CHK32. When a write operation of the second memory bank BANK_B is performed, the first write error check circuit 641 may generate the first write error signal ERR21 by comparing the second and third check bits CHK41, CHK32. When the first write error check circuit 641 generates the first write error signal ERR21 having the second voltage level, it may be determined that an error has occurred in the first write path circuit 621, the peripheral global transmission line PGIO, the repeater 650, the second write path circuit 622, and/or the second decoding circuit 632. When the first write error check circuit 642 generates the first write error signal ERR21 having the third voltage level, it may be determined that an error has occurred in the first receiver circuit 611.

A person skilled in the art to which the present disclosure pertains can understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A semiconductor memory apparatus comprising:

an encoding circuit configured to encode bank data output from a memory cell array to generate a read symbol and configured to generate a first check bit from the read symbol;

a read path circuit configured to transmit the read symbol;

a transmitter circuit configured to generate a multi-level signal based on the read symbol received from the read path circuit, and configured to generate a second check bit from the read symbol; and a read error check circuit configured to generate a read error signal based on the first check bit and the second check bit.

2. The semiconductor memory apparatus of claim 1, wherein the encoding circuit includes an encoder that encodes an 11-bit data signal of the bank data into seven symbols.

3. The semiconductor memory apparatus of claim 1, wherein the read path circuit comprises:

a latch circuit configured to latch the read symbol output from the encoding circuit; and a read global transmission line that transmits an output signal of the latch circuit, wherein the transmitter circuit is configured to receive the read symbol through the read global transmission line.

4. The semiconductor memory apparatus of claim 1, wherein the encoding circuit is configured to generate at least one bit among bits of the read symbol as the first check bit, and the transmitter circuit is configured to generate a bit for the same bit position as the at least one bit among bits of the read symbol as the second check bit.

5. The semiconductor memory apparatus of claim 1, wherein the encoding circuit is configured to perform a logic operation on a plurality of bits among bits of the read symbol to generate the first check bit, and the transmitter circuit is configured to perform a logic operation on a plurality of bits for the same bit position(s) as the plurality of bits among bits of the read symbol to generate the second check bit.

6. The semiconductor memory apparatus of claim 1, further comprising a delay circuit configured to delay the first check bit, wherein a delay time of the delay circuit corresponds to a time at which the read symbol is transmitted from the encoding circuit to the transmitter circuit.

7. The semiconductor memory apparatus of claim 1, wherein the read error check circuit is configured to generate the read error signal having a first voltage level when the first and second check bits have the same logic level, configured to generate the read error signal having a second voltage level when the first and second check bits have different logic levels and the first check bit has a first logic level, and configured to generate the read error signal having a third voltage level when the first and second check bits have different logic levels and the first check bit has a second logic level.

8. The semiconductor memory apparatus of claim 1, wherein the read error check circuit comprises:

a decision circuit configured to output a first selection signal and a second selection signal having the same voltage level when the first and second check bits have the same logic level, and configured to output the first check bit as the first selection signal and to output the second check bit as the second selection signal, when the first and second check bits have different logic levels;

a symbol generation circuit configured to generate a first transmission bit based on whether the first and second check bits have the same logic level and a logic level of the first selection signal, and configured to generate the second selection signal as a second transmission bit; and an output driver configured to generate the read error signal based on the first and second transmission bits.

9. The semiconductor memory apparatus of claim 8, wherein the symbol generation circuit is configured to output the first selection signal as the first transmission bit and to output the second selection signal as the second transmission bit, when the first and second check bits have the same logic level, configured to output the first selection signal as the first transmission bit when the first and second check bits have different logic levels and the first selection signal has a first logic level, and configured to generate the first transmission bit having a logic level opposite to the first selection signal when the first and second check bits have different logic levels and the first selection signal has a second logic level.

10. A semiconductor memory apparatus comprising:

a first memory bank that outputs a first bank data;

a second memory bank that outputs a second bank data;

a first encoding circuit configured to encode the first bank data to generate a first read symbol, and configured to generate a first check bit from the first read symbol;

a second encoding circuit configured to encode the second bank data to generate a second read symbol, and configured to generate a second check bit from the second read symbol;

a first read path circuit configured to transmit the first read symbol, and configured to output one of the first read symbol and the second read symbol as a first selected read symbol based on a channel selection signal;

a second read path circuit configured to transmit the second read symbol, and configured to provide the second read symbol to the first read path circuit or output the second read symbol as a second selected read symbol based on a channel mode signal;

a first transmitter circuit configured to generate a first multi-level signal based on the first selected read symbol, and configured to generate a third check bit from the first selected read symbol;

a second transmitter circuit configured to generate a second multi-level signal based on the second selected read symbol, and configured to generate a fourth check bit from the second selected read symbol;

a first read error check circuit configured to generate a first read error signal based on one of the first and second check bits and the third check bit based on the channel selection signal; and a second read error check circuit configured to generate a second read error signal based on the second and fourth check bits.

11. The semiconductor memory apparatus of claim 10, further comprising a repeater that transmits the second read symbol from the second read path circuit to the first read path circuit.

12. The semiconductor memory apparatus of claim 10, wherein the first encoding circuit is configured to generate at least one bit among bits of the first read symbol as the first check bit, and the first transmitter circuit is configured to generate a bit for the same bit position as the at least one bit among bits of the first read symbol as the third check bit.

13. The semiconductor memory apparatus of claim 10, wherein the first encoding circuit is configured to perform a logic operation on a plurality of bits among bits of the first read symbol to generate the first check bit, and the first transmitter circuit is configured to perform a logic operation on a plurality of bits for the same bit position(s) as the plurality of bits among bits of the first read symbol to generate the third check bit.

14. The semiconductor memory apparatus of claim 10, wherein the second encoding circuit is configured to generate at least one bit among bits of the second read symbol as the second check bit, and the second transmitter circuit is configured to generate a bit for the same bit position as the at least one bit among bits of the second read symbol as the fourth check bit.

15. The semiconductor memory apparatus of claim 10, wherein the second encoding circuit is configured to perform a logic operation on a plurality of bits among bits of the second read symbol to generate the second check bit, and the second transmitter circuit is configured to perform a logic operation on a plurality of bits for the same bit position(s) as the plurality of bits among bits of the second read symbol to generate the fourth check bit.

16. The semiconductor memory apparatus of claim 10, wherein the first read error check circuit is configured to generate the first read error signal having a first voltage level when one of the first and second check bits and the third check bit have the same logic level, configured to generate the first read error signal having a second voltage level when one of the first and second check bits and the third check bit have different logic levels and one of the first and second check bits has a first logic level, and configured to generate the first read error signal having a third voltage level when one of the first and second check bits and the third check bit have different logic levels and one of the first and second check bits has a second logic level.

17. The semiconductor memory apparatus of claim 10, wherein the second read error check circuit is configured to generate the second read error signal having a first voltage level when the second and fourth check bits have the same logic level, configured to generate the second read error signal having a second voltage level when the second and fourth check bits have different logic levels and the second check bit has a first logic level, and configured to generate the second read error signal having a third voltage level when the second and fourth check bits have different logic levels and the second check bit has a second logic level.

* * * * *